United States Patent [19]

Lattime

[11] Patent Number: 5,384,372
[45] Date of Patent: Jan. 24, 1995

[54] SHORTSTOPPING OF FREE RADICAL POLYMERIZATIONS

[75] Inventor: Richard R. Lattime, Munroe Falls, Ohio

[73] Assignee: The Goodyear Tire & Rubber Company, Akron, Ohio

[21] Appl. No.: 220,328

[22] Filed: Mar. 30, 1994

[51] Int. Cl.$^6$ .............................................. C08F 2/42
[52] U.S. Cl. .................................... 526/83; 526/84
[58] Field of Search .................................. 526/83, 84

[56] References Cited

U.S. PATENT DOCUMENTS

| | | | |
|---|---|---|---|
| 3,222,334 | 12/1965 | Demme | 526/83 |
| 3,341,487 | 9/1967 | Albert et al. | 526/83 |
| 3,644,317 | 2/1972 | Monaco et al. | 526/83 |
| 3,681,311 | 8/1972 | Patron et al. | 526/83 |
| 3,878,181 | 4/1975 | Mayer-Mader et al. | 526/83 |
| 4,096,135 | 6/1978 | Ohishi et al. | 260/79.5 B |
| 4,355,131 | 10/1982 | Wise | 524/504 |
| 4,749,757 | 6/1988 | Schram et al. | 526/83 |
| 5,002,982 | 3/1991 | Neubert | 523/407 |

*Primary Examiner*—Joseph L. Schofer
*Assistant Examiner*—Tom Weber
*Attorney, Agent, or Firm*—Bruce J. Hendricks

[57] ABSTRACT

The present invention relates to a method of terminating a free radical initiated emulsion polymerization by using a shortstopping agent selected from the group consisting of isopropylhydroxylamine and salts thereof. One advantage in using these shortstopping agents is these shortstopping agents do not contribute to the generation of volatile nitrosamines.

5 Claims, No Drawings

SHORTSTOPPING OF FREE RADICAL POLYMERIZATIONS

BACKGROUND OF THE INVENTION

Free radical initiated emulsion polymerizations are generally terminated by mixing the latices with a shortstopping agent that, under the prevailing conditions, almost immediately makes the initiator system inactive. There is available commercially a wide variety of shortstopping agents. The desirability of employing such agents is obvious in view of the need for obtaining rubbers possessing desired optimum characteristics. However, these shortstopping agents suffer from one or more shortcomings. For example, many of the commercially available compounds do not fall within what may be referred to as a "general purpose" category. For example, a shortstopping agent which might be entirely satisfactory for terminating "hot" butadiene-styrene systems (i.e., persulfate initiated polymerizations) may not be satisfactory in shortstopping "cold" butadiene-styrene systems where a powerful initiator (i.e., hydroperoxides) is used. On the other hand, shortstopping agents which may be used in both cold and hot rubber polymerization processes may possess or produce severe disadvantages such as imparting undesirable color to the rubber, being water insoluble, being susceptible to oxidation, or giving rise to materials which remain in the finished rubbers and cause undesirable and uncontrollable variations in vulcanization rates upon curing these rubbers. Another disadvantage might be the economic unattractiveness of the material as a commercial shortstopping agent brought about by the high costs of producing the material.

One particular problem arising from conventional shortstopping agents, such as the carbamate compounds and secondary amines, is that such compounds are easily nitrosated to form volatile nitrosamines. Volatile nitrosamines have recently become the subject of concern.

SUMMARY OF THE INVENTION

The present invention relates to a method for terminating a free radical initiated emulsion polymerization comprising adding to the emulsion, a shortstopping agent selected from the group consisting of isopropylhydroxylamine and salts thereof.

DETAILED DESCRIPTION OF THE INVENTION

There is disclosed a process for preparing a synthetic rubber latex by free radical initiated emulsion polymerization of at least one conjugated diolefin and optionally a copolymerizable monoolefin in an aqueous medium and terminating the polymerization by the addition of a shortstopping agent, the improvement which comprises using isopropylhydroxylamine or salt thereof as the shortstopping agent.

The shortstopping agents used in the present invention include N-isopropylhydroxylamine (free base form), isopropylhydroxylamine acetate, isopropylhydroxylamine hydrochloride and isopropylhydroxylamine sulfate. These chemicals are commercially available from Angus Chemical Company of Buffalo Grove, Ill.

At least one conjugated diolefin, and optionally a copolymerizable monoolefin is polymerized in the practice of this invention. Examples of conjugated diolefin monomers include butadiene-1,3, 2-chlorobutadiene-1,3, isoprene, piperylene, chloroprene, cyclobutadiene-1,3, 2-phenylbutadiene, 2,3-dimethylbutadiene-1,3 and the like. Representative examples of the copolymerizable monoolefin monomers include aryl olefins such as styrene, vinyl naphthylene, α-methylstyrene, parachlorostyrene and the like; α-methylenecarboxylic acids and their esters, amides and nitriles such as acrylic acid, methacrylic acid, acrylonitrile, methacrylamide, and the like and vinyl halides such as vinylidene chloride, vinyl bromide and the like. In fact, the shortstopping materials of the present invention can be employed in any addition polymerization system which proceeds through a free radical polymerization mechanism.

The amount of shortstopping agent used will vary from about 0.01 to 2.0 phm (parts per hundred parts of monomer) with about 0.05 to about 0.2 phm being preferred. The manner by which the shortstopping agent will be added will be in accord with conventional techniques used in rubber polymerization processes. Preferably, an aqueous solution of the short-stop will be added to the polymerization reaction mass when the desired conversion is obtained.

The process according to the present invention may be applied in a batchwise or continuous mode. For economic reasons, the process is preferably continuous; however, it is not believed to be critical to the overall invention.

The process of the present invention is not dependent on any particular initiator, activator, reducing agent, complex forming agent, buffer, oxygen-combining substances, emulsifier, dispersing agent, modifier and the like.

Conventional cold or hot emulsion recipes are employed with the present invention. Conventional ionic surfactants, known in the art, including sulfonate detergents and carboxylate soaps are useful in the instant invention. The level of ionic surfactant is computed based upon the total weight of monomers charged and ranges from 1 to 30 parts by weight of ionic surfactant per 100 parts by weight of monomer (phm) with 1–15 phm being more preferred and 2–10 phm being most preferred. Those skilled in the art will appreciate that these levels are higher than usually used.

The process according to the invention is preferably carried out in polymerizations in which the metal compounds of the redox system are completely (or almost completely) complexed; that is to say, that the polymerization is carried out in the presence of enough complexing agent that at least 90% of the metal compound was caused to react with it to form a water-soluble complex compound. These complexing agents therefore constitute part of the redox system and are already present at the beginning of the polymerization. A very suitable complexing agent is, for instance, a mixture of 90% of tetrasodium salt of ethylene-diaminetetraacetic acid and 10% of monosodium salt of N,N di(alpha-hydroxyethyl) glycine. Another suitable complexing agent is the disodium salt of ethylene diaminetetraacetic acid.

Free radical initiators known in the art are useful in the instant invention. For example, persulfate systems and azonitrile systems are conventionally used in hot emulsion recipes. Examples of free radical initiators conventionally used in cold emulsion recipes and useful in the practice of this invention include combinations of chelated iron salts, sodium formaldehyde sulfoxylate and organic hydroperoxides. Representative of organic hydroperoxides are cumene hydroperoxide, paramenthane hydroperoxide, diisopropylbenzene hydroperoxide, pinene hydroperoxide, and tertiary butyl hydroperoxide.

The redox recipes applied in the polymerization include an initiator (hydroperoxide) and an activator, which as a rule consists of several components (among which is the metal compound). These recipes are often varied so that other quantities are applied of the initiator and/or of the activator. The specified values can then be designated as the 100% or the 100/100 level, the desired modifications being expressed in percentages thereof, for instance 50% level or initiator/activator level =50/50.

Activators usually comprise heavy metal (Nos. 23–29 of the Periodic Table) water soluble salts, such as ferrous sulfate, cobalt chloride, cuprous chloride, nickel sulfate, etc.

When applying the process concerned, it may in certain cases be advisable to polymerize at such an initiator level that, at reaching the desired conversion, the initiator is nearly consumed. This may, for instance, be effectuated by choosing a low ratio between the initiator level and the activator level, for instance between 0.4 and 0.6.

The temperature of the polymerization may range from 0° C. to 100° C. If a hot polymerization recipe is used, the temperature of the polymerization generally ranges from about 40° C. to about 100° C. Preferably, the temperature of the hot polymerization ranges from about 45° C. to about 80° C., with a range of from about 50° C. to about 70° C. being particularly preferred. The hot polymerization is generally carried out to monomer conversion ranging from 80% to 90%. The temperature of the cold polymerization generally ranges from about 0° to 25° C. Preferably, the temperature of the cold polymerization ranges from about 5° to 20° C. with a range of from about 5° to 15° C. being particularly preferred. The cold polymerization is generally carried out to monomer conversion ranging from about 65 to 85 percent. In addition, a chain transfer agent is generally used in order to avoid excessive gel formation and control the average molecular weight.

The practice of this invention is further illustrated by reference to the following examples which are intended to be representative rather than restrictive of the scope of this invention.

All percentages are given in terms of percent by weight unless otherwise indicated. The term "parts" as employed in the following examples refers to parts by weight of shortstopping agent per 100 parts of monomer charged.

EXAMPLE 1

Four free radical initiated emulsion polymerizations were carried out using a cold soap styrene-butadiene polymerization recipe listed below:

| MATERIAL | PARTS |
|---|---|
| Styrene | 32.0 |
| Butadiene | 68.0 |
| Water | 215.00 |
| Fatty Acid Soap | 2.5 |
| Rosin Acid Soap | 2.5 |
| Dispersion Aid | 0.18 |
| Total Electrolyte | 0.45 |
| Chelated Iron Complex | 0.01 |
| Sodium Formaldehyde Sulfoxylate | 0.04 |
| t-DDM[1] | 0.14 |

-continued

| MATERIAL | PARTS |
|---|---|
| PMHP[2] | 0.05 |

[1]Tertiary dodecyl mercaptan
[2]Paramenthane hydroperoxide

All polymerizations were carried out at 10° C. to about 62% conversion of monomer to polymer. The shortstopping agent was then added. Sample 1 was shortstopped with a dilute aqueous solution of a 89/11 ratio by weight mixture of sodium dimethyldithiocarbamate (DTC) and N,N-diethylhydroxylamine (DEHA). Sample 2 was shortstopped with a dilute aqueous solution of isopropylhydroxylamine (IPHA). Sample 3 was shortstopped with a dilute aqueous solution of hydroxylamine (HA). Sample 4 was shortstopped with a dilute (30%) aqueous solution of hydroxylamine sulfate (HAS). Examples 1, 3 and 4 were performed as controls. The table below contains the level of shortstopping agent that was used and other pertinent data.

The presence of nitrosoamines was determined by an analytical method based on gas chromatography using a thermal energy analyzer.

TABLE I

| Latex Sample | Control 1 | 2 | Control 3 | Control 4 |
|---|---|---|---|---|
| DTC[1]/DEHA[2] (phm) | .25/.03 | 0 | 0 | 0 |
| Isopropylhydroxylamine (phm) | 0 | .03 | 0 | 0 |
| Hydroxylamine (phm) | 0 | 0 | .02 | |
| Hydroxylamine sulfate 30% (phm) | | | | .133 |
| Nitrosoamines (2 analysis per sample) | | | | |
| NDMA[3] (ng in 5 g sample) | 151/184 | ND[5] | 16/23 | 17/29 |
| DNEA[4] (ng in 5 g sample) | 40/33 | ND | ND | 26/33 |

[1]sodium dimethyldithiocarbamate
[2]N,N-diethyl hydroxylamine
[3]N-nitrosodimethylamine
[4]N-nitrosodiethylamine
[5]Not detected Use of the conventional shortstopping agents in Sample 1 resulted in very high levels of nitrosoamines being detected in the latex. Sample 3 was produced using hydroxylamine as a shortstopping agent and whereas it resulted in no detectable DNEA; however, NDMA was detected. Use of hydroxylamine sulfate resulted in the detection of both DMA and DNEA. Surprisingly, use of isopropylhydroxylamine resulted in no NDMA or DNEA being detected.

What is claimed is:

1. A method for terminating a free radical initiated emulsion polymerization comprising adding to the emulsion a shortstopping agent selected from the group consisting of isopropylhydroxylamine and salts thereof.

2. The method of claim 1 wherein from 0.01 to 2.0 parts by weight of shortstopping agent per one hundred parts by weight of monomer is added to the emulsion.

3. The method of claim 1 wherein the shortstopping agent is isopropylhydroxylamine.

4. The method of claim 1 wherein said salts of isopropylhydroxylamine are selected from the group consisting of isopropylhydroxylamine acetate, isopropylhydroxylamine hydrochloride, and isopropylhydroxylamine sulfate.

5. In the process of preparing a synthetic rubber latex by free radical initiated emulsion polymerization of at least one conjugated diolefin and optionally a copolymerizable monoolefin in an aqueous medium and terminating the polymerization by the addition of a shortstopping agent, the improvement which comprises using isopropylhydroxylamine or salt thereof as the shortstopping agent.

* * * * *

Disclaimer 5,384,372—Richard R. Lattime, Munroe Falls, Ohio. SHORTSTOPPING OF FREE RADICAL POLYMERIZATIONS. Patent dated January 24, 1995. Disclaimer filed October 15, 2001, by the assignee, The Goodyear Tire & Rubber Company.

Hereby disclaims and dedicates to the Public all claims and entire term of said patent.
*(Official Gazette May 21, 2002)*